United States Patent
Panin et al.

(10) Patent No.: US 12,530,828 B2
(45) Date of Patent: Jan. 20, 2026

(54) PARAMETRIC IMAGING WITHOUT PRE-SCAN BLOOD INPUT FUNCTION

(71) Applicant: Siemens Medical Solutions USA, Inc., Malvern, PA (US)

(72) Inventors: Vladimir Panin, Knoxville, TN (US); David Pigg, Maryville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 255 days.

(21) Appl. No.: 18/514,169

(22) Filed: Nov. 20, 2023

(65) Prior Publication Data

US 2025/0166249 A1 May 22, 2025

(51) Int. Cl.
| | | |
|---|---|---|
| *G06K 9/00* | (2022.01) | |
| *A61B 6/03* | (2006.01) | |
| *G06T 7/00* | (2017.01) | |
| *G06T 11/00* | (2006.01) | |

(52) U.S. Cl.
CPC .......... *G06T 11/008* (2013.01); *A61B 6/037* (2013.01); *G06T 7/0016* (2013.01); *G06T 2207/10104* (2013.01); *G06T 2207/30101* (2013.01)

(58) Field of Classification Search
CPC ............... G06T 11/008; G06T 7/0016; G06T 2207/10104; G06T 2207/30101; G06T 11/006; A61B 6/037; A61B 6/486; A61B 6/507; A61B 6/5205; A61B 6/5217; A61B 6/5235

See application file for complete search history.

(56) References Cited

U.S. PATENT DOCUMENTS

| | | | |
|---|---|---|---|
| 10,722,189 B2 | 7/2020 | Hu et al. | |
| 11,103,199 B2 * | 8/2021 | Hu | G06T 11/005 |
| 11,172,903 B2 * | 11/2021 | Zhu | A61B 6/5217 |
| 11,801,028 B2 * | 10/2023 | Zhu | A61B 6/5217 |
| 2003/0004405 A1 * | 1/2003 | Townsend | A61B 6/463 |
| | | | 600/407 |
| 2011/0229000 A1 * | 9/2011 | Maroy | G16C 20/30 |
| | | | 382/131 |
| 2015/0363948 A1 * | 12/2015 | Leahy | A61B 6/504 |
| | | | 600/425 |
| 2017/0039706 A1 * | 2/2017 | Mikhno | A61B 6/501 |
| 2018/0303438 A1 * | 10/2018 | Hu | A61B 6/5217 |
| 2018/0317861 A1 * | 11/2018 | Sun | A61B 6/541 |
| 2018/0353147 A1 * | 12/2018 | Wang | G06T 11/005 |
| 2019/0059831 A1 * | 2/2019 | Hu | A61B 6/5205 |
| 2020/0037975 A1 * | 2/2020 | Zhu | A61B 6/507 |
| 2020/0126214 A1 * | 4/2020 | Hu | A61B 6/032 |
| 2020/0320753 A1 * | 10/2020 | Feng | A61B 6/037 |
| 2021/0118202 A1 * | 4/2021 | Feng | A61B 6/486 |
| 2023/0260173 A1 * | 8/2023 | Feng | A61B 5/0037 |
| | | | 382/131 |
| 2024/0398361 A1 * | 12/2024 | Ye | A61B 6/037 |
| 2025/0032062 A1 * | 1/2025 | Sun | G06T 11/005 |

* cited by examiner

*Primary Examiner* — Atiba O Fitzpatrick

(57) ABSTRACT

Systems and methods include acquisition of positron emission tomography (PET) data of a volume comprising blood and tissue, determination, from the acquired PET data, of a blood input function (BIF) from a time at which non-metabolized radionuclide tracer within the volume has reached a steady state between the blood and the tissue, and determination of parametric images based on the acquired PET data, the determined BIF and a parametric model which does not include BIF values prior to the time.

11 Claims, 10 Drawing Sheets

PARAMETRIC IMAGING WITHOUT PRE-SCAN BLOOD INPUT FUNCTION

BACKGROUND

According to conventional positron-emission-tomography (PET) imaging, a radionuclide tracer is introduced into a patient via arterial injection. Radioactive decay of the tracer generates positrons which eventually encounter electrons and are annihilated thereby. The annihilation produces two 511 keV photons which travel in approximately opposite directions. A ring of detectors surrounding the body detects photons, identifies "coincidences" based thereon, and reconstructs an image of standardized uptake values (SUVs) based on the identified coincidences. An SUV is a semi-quantitative surrogate of tissue metabolism and the image therefore provides an estimate of disease burden distribution.

Dynamic wholebody (D-WB) PET imaging includes multiple WB passes which identify coincidences and record the times at which coincidences occur. This time-specific (i.e., dynamic) PET data allows generation of parametric images based on parametric imaging models, such as Patlak and Logan. Parametric images determined from dynamic PET data may include images representing the metabolic rate (MR) of tracer uptake into the tissue and images representing the distribution volume (DV) of free tracer within the tissue. Such parametric images may provide lesion target-to-background ratios which are superior to conventional SUV images and may complement conventional SUV images to result in fewer false positive findings.

Currently, the generation of parametric images based on parametric imaging models requires values of a Blood Input Function (BIF) from the moment of tracer injection. The BIF values represent the concentration of tracer in blood over time. In one approach, the values are obtained by scanning the patient immediately after tracer injection through steady state (e.g., from 0-75 min post-injection) and estimating the BIF values directly from the resulting SUV images. In a second approach, the values are obtained by retrieving post-injection population-based BIF (PBIF) values from a pre-existing data store and scaling the PBIF values based on BIF values estimated from later (e.g., post-steady state)— acquired SUV images.

Both of the above approaches present difficulties. The first approach is uncomfortable for the patient, causes imaging artifacts due to the high likelihood of patient motion, and monopolizes the imaging theatre for long periods. The second approach requires population-based BIF (PBIF) values which may be unavailable or poorly-suited to a particular patient. Systems are desired to efficiently generate suitable parametric PET images.

DETAILED DESCRIPTION

The following description is provided to enable any person in the art to make and use the described embodiments. Various modifications, however, will remain apparent to those in the art.

Generally, some embodiments generate parametric images based on dynamic PET data acquired during a period after non-metabolized radionuclide tracer reaches a steady state between blood and tissue. Some embodiments generate parametric images without requiring BIF values prior to the acquisition period. According to some embodiments, parametric images are generated using parametric models which replace pre-acquisition period BIF values with an initial steady state tissue activity concentration value and an initial steady state BIF value.

Figure 1A:
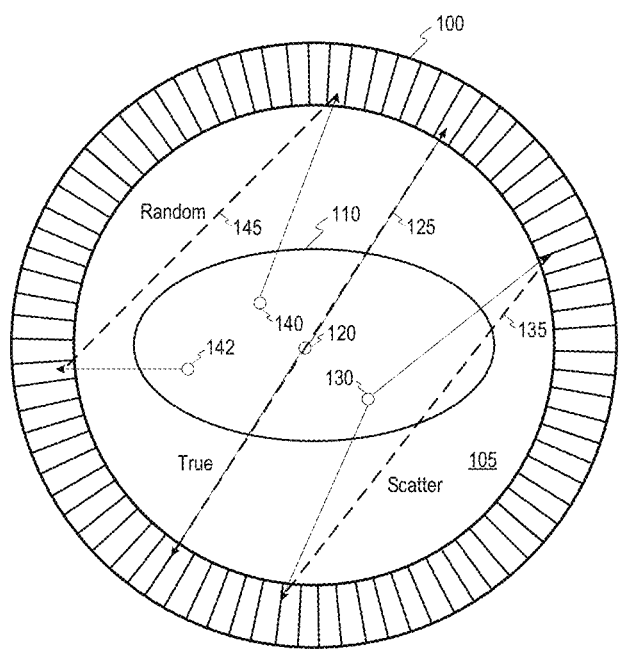
FIGS. 1A and 1B illustrate detection of coincidence events according to some embodiments.
Figure 1B:
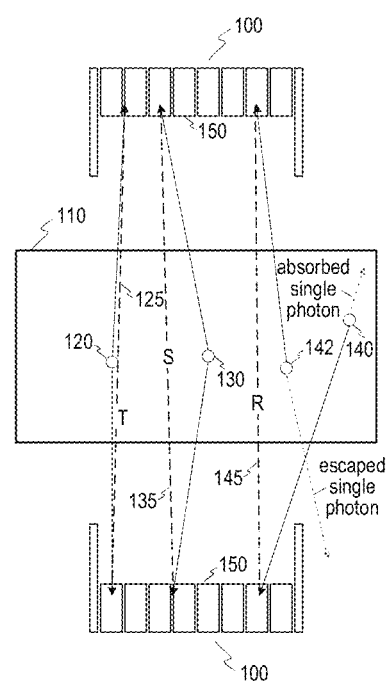

FIG. 1A and FIG. 1B illustrate detection of coincidences by a PET scanner according to some embodiments. FIG. 1A is a transaxial view of bore 105 of PET scanner detector ring 100 and imaging subject 110 disposed therein. Imaging subject 110 may comprise a human body, a phantom, or any other suitable subject. FIG. 1B is an axial view of detector ring 100 and body 110 of FIG. 1A. Detector ring 100 is composed of an arbitrary number (eight in this example) of adjacent and coaxial rings of detectors 150 in the illustrated example. Each detector 150 may comprise any number of detector crystals and electrical transducers.

The detector crystals may comprise lutetium oxyorthosilicate (LSO), lutetium-yttrium oxyorthosilicate (LYSO), or any other suitable materials that are or become known. The detector crystals create light photons in response to receiving 511 keV photons and in response to receiving the emitted background radiation. The electrical transducers, or photosensors, convert these light photons to electrical signals, sometimes referred to herein as pulses. According to some embodiments, the electrical transducers may comprise silicon photomultipliers (SiPMs) or photomultiplier tubes (PMTs).

Annihilations 120, 130, 140 and 142 are assumed to occur at various locations within subject 110. As described above, an injected tracer generates positrons which are annihilated by electrons to produce two 511 keV photons which travel in approximately opposite directions. Each of annihilations 120, 130, 140 and 142 results in the detection of a coincidence. True coincidences represent valid image data, while scatter and random coincidences represent noise associated with incorrect event position information.

A coincidence is identified when two detector crystals disposed on opposite sides of the body detect the arrival of two photons within a short time window indicating that the two photons arose from the same positron annihilation. Because the two "coincident" photons travel in approximately opposite directions, the locations of the two detector crystals determine a Line-of-Response (LOR) along which an annihilation may have occurred. Time-of-flight (TOF) PET additionally measures the difference between the detection times of the two photons arising from the annihilation. This difference may be used to estimate a particular position along the LOR at which the annihilation occurred.

Annihilation 120 is associated with a true coincidence because annihilation 120 resulted in two photons which were detected within the coincidence time window and because the position of annihilation 120 lies on LOR 125 connecting the positions of the crystals at which the two photons were received.

Annihilation 130 is associated with a scatter coincidence because, even though the two photons resulting from annihilation 130 were detected within the coincidence time window, the position of annihilation 130 does not lie on LOR 135 connecting the two photon positions. This may be due to Compton (i.e., inelastic) or Coherent (i.e., elastic) scatter resulting in a change of direction of at least one of the two annihilation photons within subject 110.

Annihilations 140 and 142 are two separate annihilations which result in detection of a random coincidence. In the present example, one of the photons generated by annihilation 140 is absorbed in body 210 and one of the photons generated by annihilation 142 escapes detection by any detector 150 of detector ring 100. The remaining two photons generated by the two annihilations happen to be detected within the coincidence time window, even though no annihilation occurred on LOR 145 connecting the positions at which the coincident photons were received.

The detected coincidences may be stored as raw (i.e., list-mode) data and/or sinograms. List-mode data may represent each coincidences using data specifying a LOR between two crystals, the time at which each photon of the annihilation reached each crystal, the photon energies, etc. A sinogram is a data array of the angle versus the displacement of the LORs of each detected coincidence. A sinogram includes one row containing the LOR for a particular azimuthal angle φ. Each of these rows corresponds to a one-dimensional parallel projection of the tracer distribution at a different coordinate. A sinogram stores the location of the LOR of each coincidence such that all the LORs passing through a single point in the volume trace a sinusoid curve in the sinogram. Since only the true unscattered coincidences indicate locations of annihilations, random coincidences and scatter coincidences are often subtracted from or otherwise used to correct acquired list-mode data or sinograms during reconstruction of a PET image based thereon.

Figure 2:
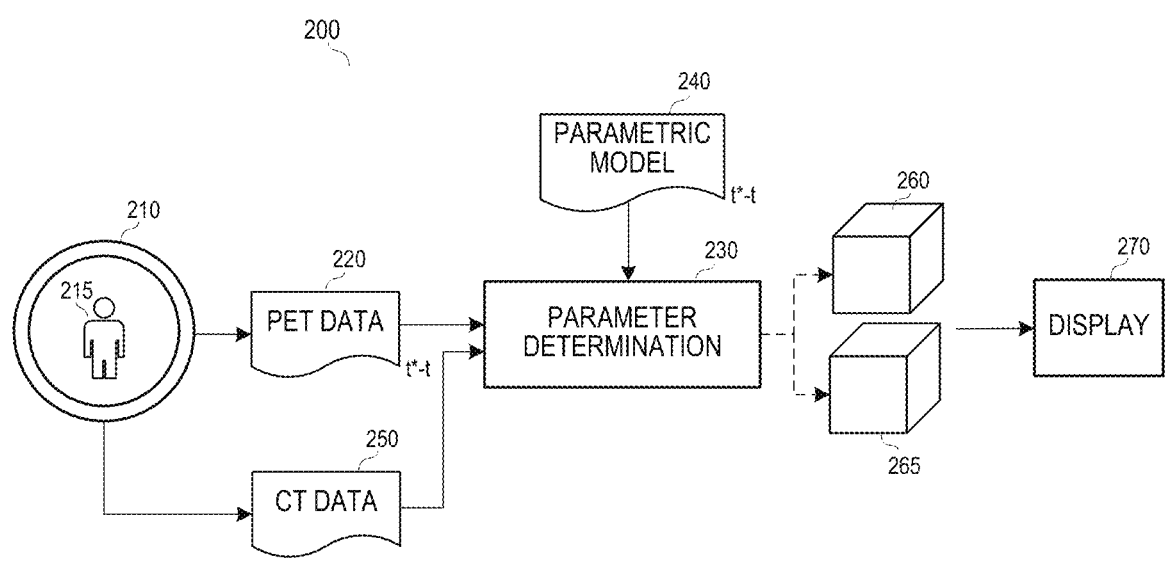
FIG. 2 is a block diagram of a system to generate parametric images according to some embodiments.

FIG. 2 is a block diagram of system 200 to generate parametric images according to some embodiments. PET/CT system 210 is capable of acquiring PET data and CT data representing patient 215. Using the same system to acquire PET data and CT data may facilitate registration of images reconstructed therefrom, particularly in a case where patient 215 remains in position on a scanning bed between the acquisitions. Moreover, thusly-acquired CT data may be used to accurately inform reconstruction of a PET image from the acquired PET data as is known in the art.

PET/CT system 210 may comprise any system to acquire PET data and CT data that is or becomes known. Such systems may or may not provide TOF PET data, photon counting, continuous bed motion (CBM) imaging, and other imaging features. Some embodiments are implemented using a PET-only imaging system, with any necessary CT data being acquired by a separate system before and/or after acquisition of the PET data.

To acquire PET data 220, a radionuclide tracer is introduced into patient 215. The tracer may be introduced through a peripheral venous catheter in the patient's arm. An injection speed (e.g., mL/s), an injection duration and a bolus shape may be determined as is known in the art. Any suitable tracer may be used, such as $^{18}$F-fluorodeoxyglucose (FDG) which is conventionally used for imaging glucose metabolism.

Acquisition of PET data 220 begins once the non-metabolized tracer has reached a steady state between blood and tissue of patient 215. The time at which this steady state is reached, denoted as t* in FIG. 2, depends on the physiological properties of the tissue and is typically known. In some embodiments, t* is assumed to be 50 minutes post-injection.

PET data 220 is acquired as list-mode data and/or sinograms from t* to time t (e.g., 70 minutes post-injection). As is known in the art, the list-mode data and/or sinograms may be segregated into frames, each of which is associated with a particular acquisition time period between t* and t. In one example, each frame represents PET data acquired over a respective five-minute span between t* and t. As is also known in the art, each frame of PET data may be acquired during a single respective CBM WB pass.

Parameter determination component 230 determines parametric images 260 and 265 based on PET data 220, a post-t* BIF, and parametric model 240. Parametric images 260 and 265 may be displayed, together or independently, on display 270. In some embodiments, parametric images 260 and 265 are displayed on display 270 along with an SUV image reconstructed from PET data 220.

Model 240 does not include functions of BIF values prior to t*. Model 240 may include basis functions which do not include times prior to the steady state, where each basis function represents a parameter to be imaged. In some embodiments, model 240 comprises $$C_t(t) - C_t(t^*) = K_i \int_t^t C_b(t')dt' + DV(C_b(t) - C_b(t^*)), t > t^*$$

where t* is the time at which the non-metabolized tracer has reached a steady state between the blood and the tissue, $C_t$ is the tracer activity concentration in tissue, $C_b$ is the tracer concentration in arterial blood supplying the tissue (i.e., BIF), $K_i$ is the rate of irreversible uptake, and DV is the apparent blood volume and distribution volume of the non-metabolized tracer. Accordingly, parametric image 260 may depict a value of $K_i$ for each image voxel while parametric image 265 may depict a value of DV for each image voxel. In the case of an FDG tracer, $K_i$ multiplied by the patient's blood glucose results in the metabolic rate ($MR_{FDG}$) of FDG and therefore parametric image 260 may depict a value of $MR_{FDG}$ for each image voxel.

Advantageously, the estimation of $K_i$ and DV using model 240 only requires values of $C_b$ and $C_t$ after t* so patient 215 need only be subjected to PET scanning between t* and t. Moreover, the estimation of $K_i$ and DV using model 240 does not require population-based or otherwise-derived values of $C_b$ prior to t*, which may cause in error in conventional systems. The above example of parametric model 240 assumes irreversible uptake of the tracer. However, FDG binds irreversibly within lesions so this assumption holds true in some clinical scenarios.

Parametric model 240 may account for reversible tracer binding, as evidenced by other tracers (e.g., $^{68}$Ga-PSMA-11). For example, model 240 may comprise $$C_t(t) = \alpha C_b(t) - \alpha e^{\frac{t-t^*}{\beta}} C_b(t^*) - \alpha \int_{t^*}^{t} e^{\frac{t-t'}{\beta}} \left(\frac{d}{dt'} C_b(t')\right) dt' + C_t(t^*) e^{\frac{t-t^*}{\beta}}, t > t^*$$

where t* is the time at which the non-metabolized tracer has reached a steady state between the blood and the tissue, $C_t$ is the tracer activity concentration in tissue, and $C_b$ is the tracer concentration in blood supplying the tissue. $\alpha$ and $\beta$ are the slope and intercept of the standard Logan equation. $\alpha$ is a measure of relative concentration in tissue to that in blood, and $\beta$ is a measure of free tracer. $\alpha$ and $\beta$ are composite parameters (i.e., functions of k1-k4 microparameters) and thus more robust than k1-k4 to image noise.

Post-t* BIF values may be determined from blood samples acquired continuously or periodically from patient 215 after t*. In other implementations, CT and PET imaging is used to track post-t* tracer concentration within a blood-containing region in the heart or an arterial vessel lumen. For example, the CT imaging components of system 210 may generate CT data 250 consisting of projection images of tissues indicating their relative x-ray attenuation coefficients. Three-dimensional CT images may be reconstructed based on CT data 250 as is known in the art. The locations of the left ventricle and descending aorta are identified from the three-dimensional CT images, automatically and/or with operator assistance. Volumes of interest are defined around the left ventricle and descending aorta with the purpose of tracking the mean change in activity over that volume over time. The geometry of these volumes is intended to be small enough to minimize partial volume errors and large enough to minimize noise. In some examples, a 24 mm diameter sphere is used in left ventricle and a 10 mm×20 mm cylinder is used for the descending aorta. Parameter determination component 230 reconstructs three-dimensional PET images from each frame of PET data 220 and registers the PET images, each of which is associated with a respective time period, to the three-dimensional CT image. The CT image-defined volumes are extracted from each registered PET image and the post-t* BIF (referred to as an image-derived input function (IDIF)) is determined from the time-varying activity depicted in the extracted PET image volumes.

As will be described in more detail below, parameter determination component 230 may generate parametric images 260 and 265 by extracting time activity curves (TACs) from a time-series of SUV images reconstructed from PET data 220 and fitting parametric model 240 to the TAC of every image voxel. Due to the poor statistics and high noise associated with TAC measurements at the voxel level, in particular for D-WB acquisitions, thusly-generated parametric images can be unsuitably corrupted by noise and potentially biased. Alternatively, to improve parametric image noise and reduce bias, parameter determination component 230 may use direct reconstruction techniques to generate parametric images 260 and 265 from PET data 220 and parametric model 240 without relying on an intermediate SUV image.

Figure 3:
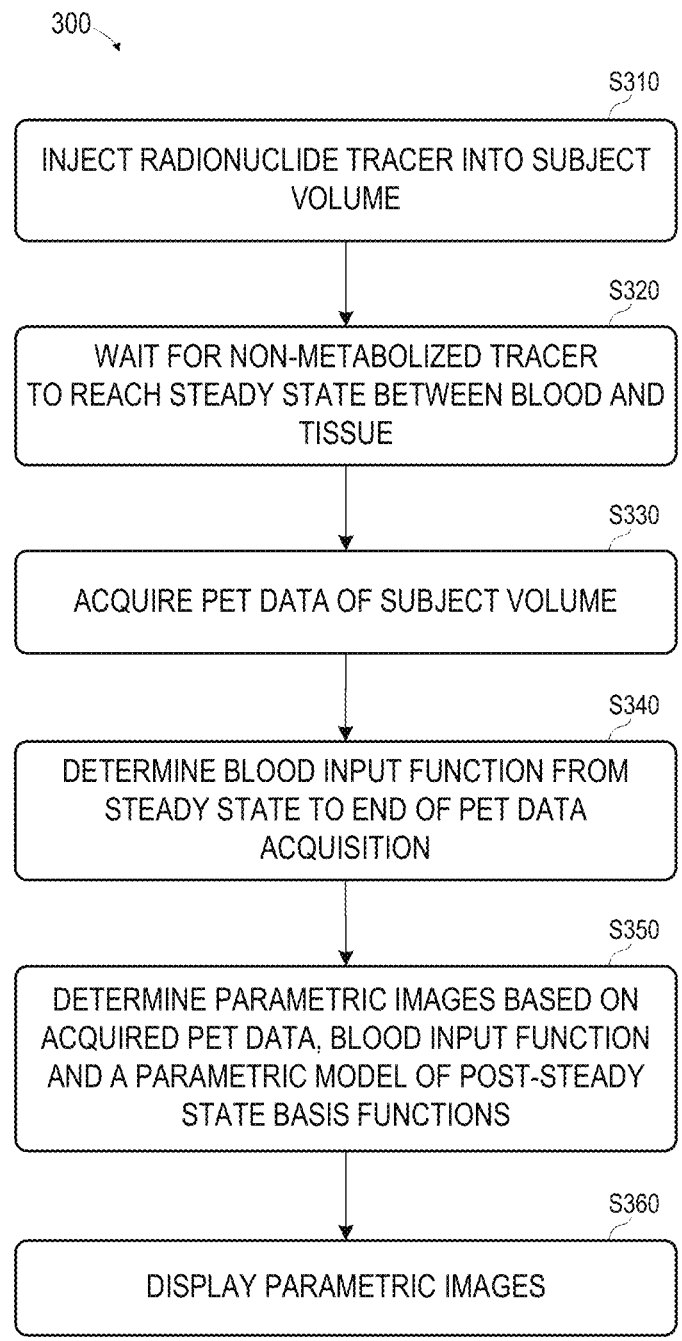
FIG. 3 is a flow diagram of a process to generate parametric images according to some embodiments.

FIG. 3 is a flow diagram of process 300 to generate parametric images according to some embodiments. Process 300 and all other processes described herein may be performed by any combination of hardware and software that is or becomes known, for example hardware and software implementing system 200. Program code embodying these processes may be stored by any non-transitory tangible medium, including a fixed disk, a volatile or non-volatile random-access memory, a DVD, a Flash drive, and a magnetic tape, and executed by any suitable processing unit, including but not limited to one or more microprocessors, microcontrollers, processing cores, and processor threads. Embodiments are not limited to the examples described below.

Initially, a radionuclide tracer is injected into a volume including blood and tissue at S310. At S320, flow pauses until non-metabolized tracer reaches a steady state between the blood and the tissue. Determination of whether the steady state has been reached may be based on a predetermined time period (e.g., assume the steady state is reached after 50 minutes) and/or on detecting that the non-metabolized tracer has reached a steady state between the blood and the tissue. According to some embodiments, CT data of the volume is acquired at S320 for use in determining a post-steady state BIF as will be described below.

PET data of the volume is acquired at S330, after the steady state has been reached. The PET data is dynamic, consisting of multiple frames of PET data (e.g., list-mode and/or sinogram) which each correspond to a respective acquisition period. Each frame may be acquired during a single respective CBM WB pass in some embodiments.

Next, at S340, a BIF is determined from a time at which the steady state was reached until the end of the PET data acquisition. The BIF may be determined at S340 by taking periodic blood samples during this time period. Alternatively, as described above, the BIF may be determined by identifying blood-containing volumes within a CT image and tracking the activity within those volumes over time using SUV images reconstructed from the post-steady state-acquired PET data. S340 may comprise any method for determining the post-steady state BIF.

Figure 4:
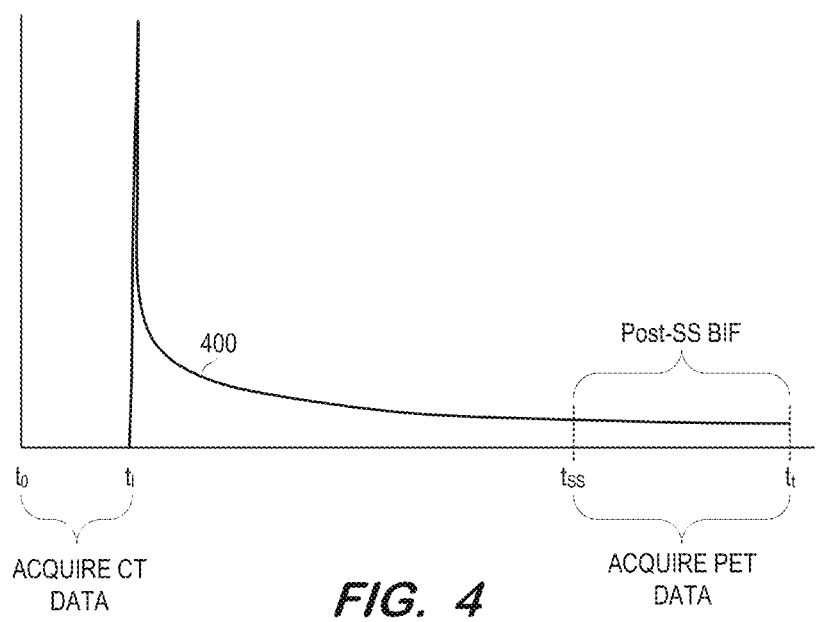
FIG. 4 illustrates a BIF and timing of data acquisitions according to some embodiments.

FIG. 4 illustrates BIF 400 and timing of data acquisitions according to some embodiments of process 300. As shown, and as an alternative to the above description of process 300, CT data of the subject volume is acquired between $t_0$ and $t_I$, where $t_I$ denotes an injection start time. BIF 400 quickly peaks after $t_I$ and begins to decrease. It is assumed that $t_{SS}$ denotes a time at which non-metabolized tracer is in a steady state between blood and tissue of the subject volume. Accordingly, flow pauses at S320 from $t_I$ to $t_{SS}$, at which point PET data is acquired at S330. FIG. 4 also illustrates the post-steady state (i.e., post-$t_{SS}$) BIF determined at S340.

Parametric images are determined at S350 based on the acquired PET data, the determined post-steady state BIF, and a parametric model of post-steady state basis functions. The parametric model does not include BIF values prior to the steady state. The parametric model may comprise either of the parametric models described above or any other parametric model which does not include BIF values prior to the steady state.

The parametric images may be determined "indirectly", by extracting time activity curves TACs from a time-series of SUV images reconstructed from the PET data and fitting the parameters of the parametric model to the TAC of every image voxel. In other embodiments, the parametric images may be determined "directly" by fitting the parameters of the parametric model within a PET reconstruction, without reliance on an intermediate SUV image.

The parametric images are displayed at S360. Each basis function of the parametric model may be associated with a respective parameter, and each image voxel of a parametric image may depict a value of a respective parameter for that voxel. The images may be displayed as three-dimensional images, slices, or in any manner that is or becomes known.

Figure 5:
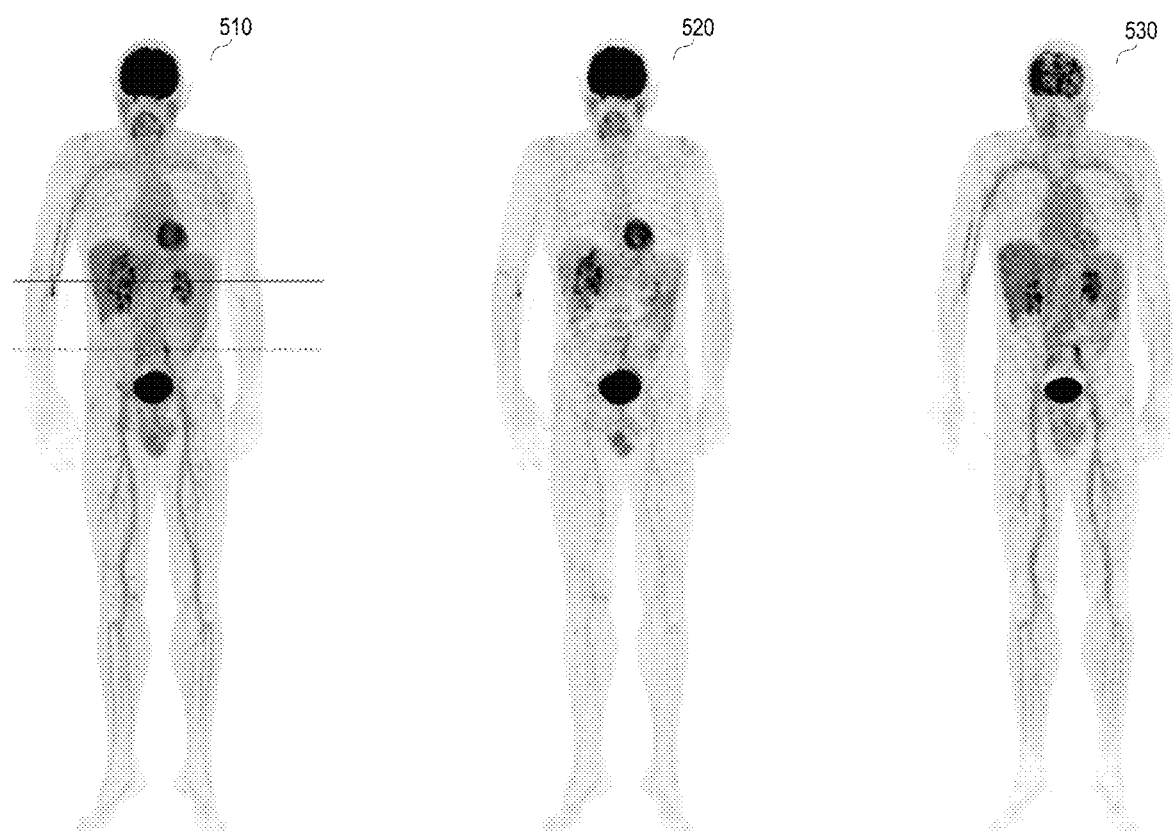
FIG. 5 illustrates an SUV image, an MR image and a DV image according to some embodiments.

FIG. 5 illustrates SUV image 510, MR image 520 and DV image 530 displayed at S360 according to some embodiments.

Figure 6:
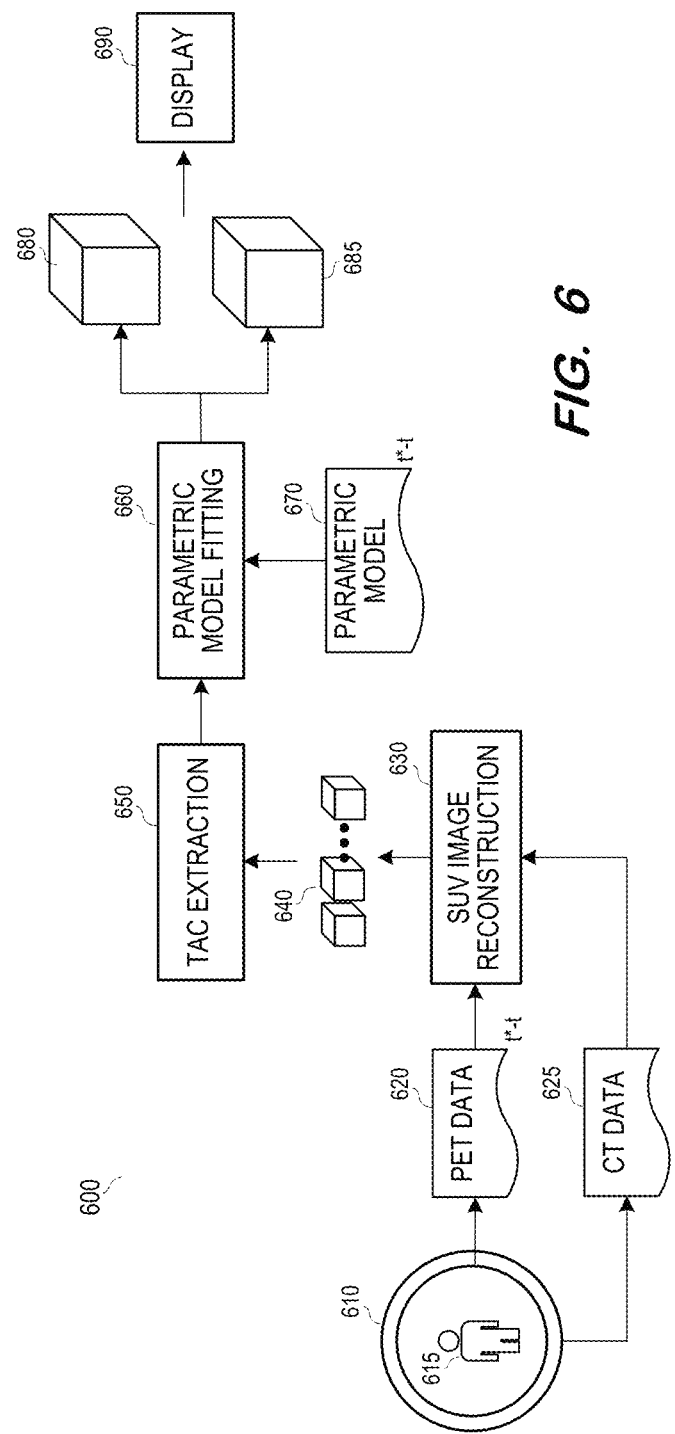
FIG. 6 is a block diagram of a system to generate parametric images using indirect reconstruction according to some embodiments.
Figure 7:
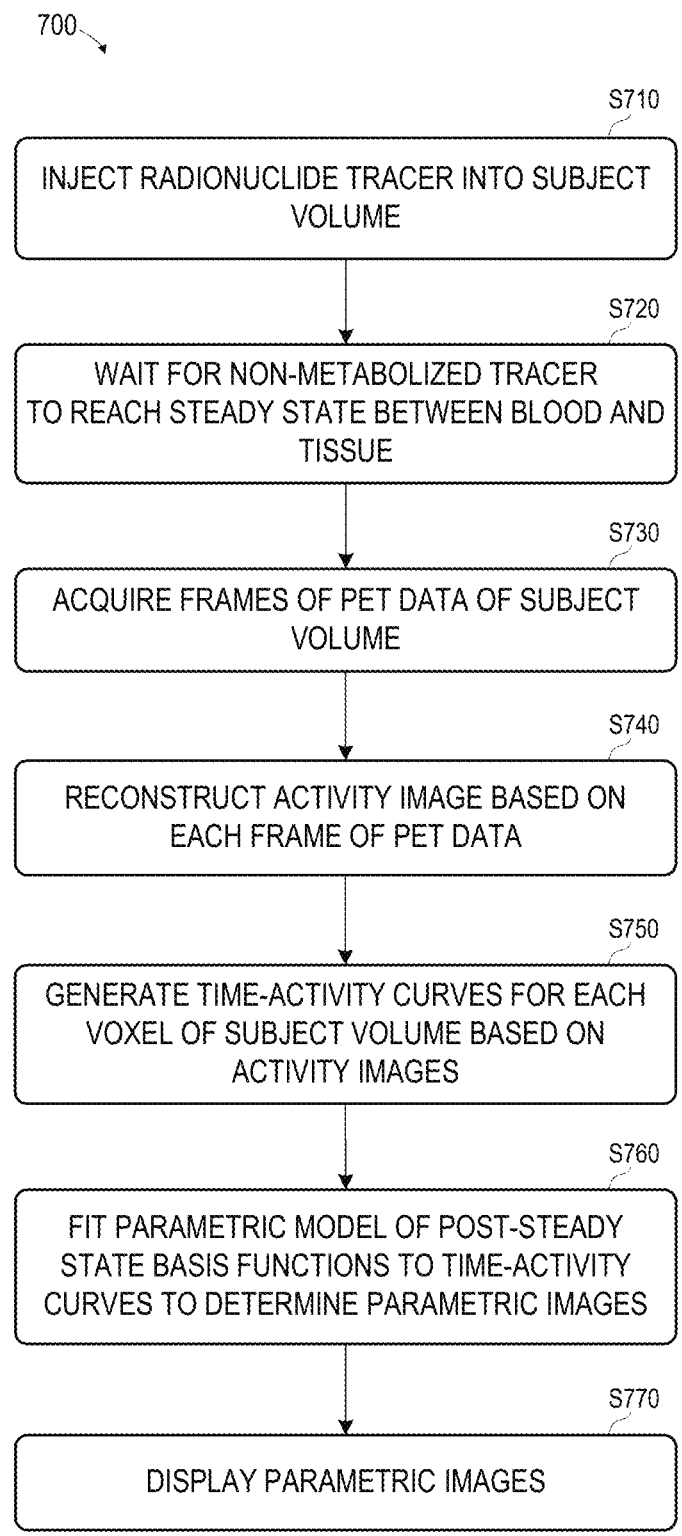
FIG. 7 is a flow diagram of a process to generate parametric images using indirect reconstruction according to some embodiments.

FIG. 6 is a block diagram of system 600 to generate parametric images using indirect reconstruction according to some embodiments. Operation of system 600 according to some embodiments will be described with respect to process 700 of FIG. 7.

At S710, a radionuclide tracer is injected into patient 615. Flow pauses at S720 until non-metabolized tracer reaches a steady state between the blood and the tissue of patient 615. PET/CT system 610 may be operated at S720 to acquire CT data 625 of patient 615. PET data 620 of patient 615 is then acquired at S730.

At S740, SUV image reconstruction component 630 reconstructs an SUV (i.e., "activity") image for each frame of PET data 620. SUV image reconstruction component 630 may use any reconstruction algorithm that is or becomes known, which may in turn use a linear attenuation coefficient map generated based on CT data 625. Since each frame is associated with a particular time period, images 640 generated by component 630 represent a time-series of activity images.

TAC extraction component extracts a TAC for each image voxel based on images 640 at S750. Next, at S760, parametric model fitting component 660 fits the extracted TACs of each voxel to parametric model 670 to determine parametric images 680 and 685. Parametric model 670 does not include BIF values prior to the steady state but does require post-steady state BIF values. Accordingly, the post-steady state BIF values may be determined during process 700 using periodic blood sampling or by tracking the activity within CT image-derived volumes of images 640 as described above. Parametric images 680 and 685 are displayed on display 690 at S770.

Figure 8:
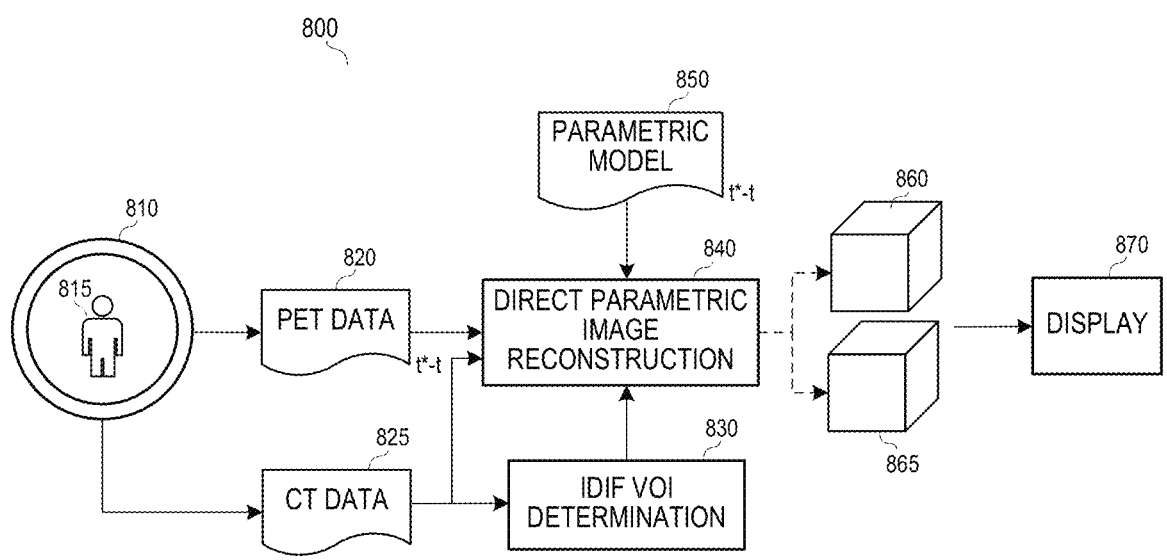
FIG. 8 is a block diagram of a system to generate parametric images using direct reconstruction according to some embodiments.
Figure 9:
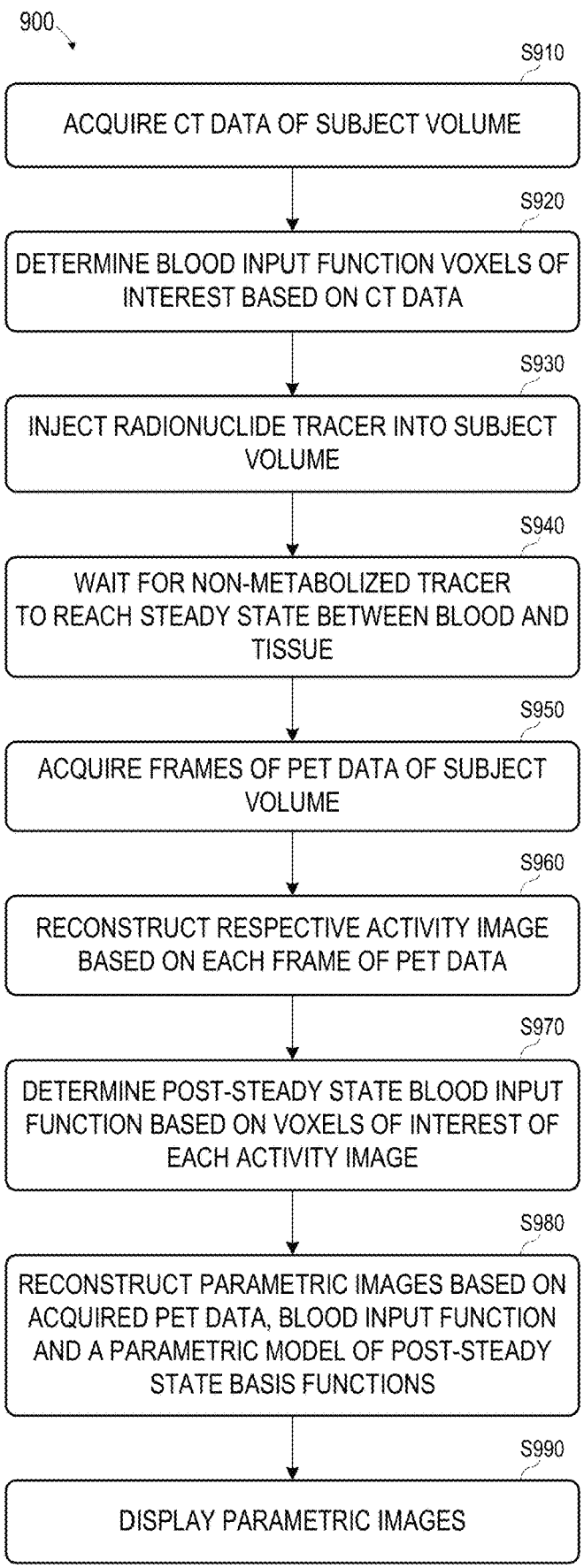
FIG. 9 is a flow diagram of a process to generate parametric images using direct reconstruction according to some embodiments.

FIG. 8 is a block diagram of system 800 to generate parametric images using direct reconstruction according to some embodiments. Operation of system 800 according to some embodiments will be described with respect to process 900 of FIG. 9.

PET/CT system 810 acquires CT data 825 of patient 815 at S910. Next, at S920, IDIF voxels of interest (VOI) component 830 determines voxels associated with determination of a BIF. In some embodiments, component 830 reconstructs a three-dimensional CT image based on CT data 825 as is known in the art. Component 830 identifies the locations of the left ventricle and descending aorta and determines VOIs including the left ventricle and the descending aorta as described above.

A radionuclide tracer is injected into patient 815 at S930. Flow pauses at S940 as previously described until non-metabolized tracer reaches a steady state between the blood and the tissue of patient 815. System 910 is then operated at S950 to acquire frames of PET data 820 of patient 815. As shown in FIG. 8, PET data 820 includes frames over a time period from t* to t.

At S960, direct parametric image reconstruction component 840 reconstructs an activity image for each frame of PET data 820. Each frame of PET data 820 is associated with a particular time period, so the activity images constitute a time-series of activity images. A post-steady state BIF is determined at S970 based on the VOIs within each of the activity images. In one example of S970, the activity images reconstructed at S960 are registered against the three-dimensional CT image and the VOIs determined at S920 are identified within each registered activity image. The activity within the identified VOIs of an activity image may represent a value of the BIF at the time period associated with the activity image (i.e., the time period over which the PET data of the activity image was acquired). The activity within the identified VOIs of each activity image therefore represents values of the BIF over time (i.e., a post-steady state BIF).

Direct parametric image reconstruction component 840 reconstructs parametric images 860 and 865 at S980 based on PET data 820, the determined post steady-state BIF and parametric model 850. Parametric model 850 may comprise either of the parametric models described above or any other parametric model which does not include BIF values prior to the steady state. According to some embodiments, component 840 fits parametric model 850, including post-steady state values of the BIF, during reconstruction of an image depicting radiation per unit volume (e.g., Bq/ml) or an SUV image based on PET data 820. Such reconstruction may utilize a linear attenuation coefficient map derived from CT data 825.

According to some embodiments, parametric images 860 and 865 are reconstructed at S980 using a nested expectation maximization (EM) algorithm as described in J. Hu et al., "Design and Implementation of Automated Clinical Whole Body Parametric PET With Continuous Bed Motion", IEEE Trans. Radiat. Plasma Med. Sci., vol. 4, no. 6, pp. 696-707, November 2020, the contents of which are incorporated herein by reference for all purposes.

Parametric images 860 and 865 are displayed by display 870 at S990. Again, each basis function of the parametric model may be associated with a respective parameter, and each image voxel of a parametric image may depict a value of a respective parameter for that voxel. The images may be displayed as three-dimensional images, slices, or in any manner that is or becomes known. Since direct reconstruction at S980 includes generation of an Bq/ml image, this image (and/or an SUV image derived therefrom) may also be displayed at S990.

Figure 10:
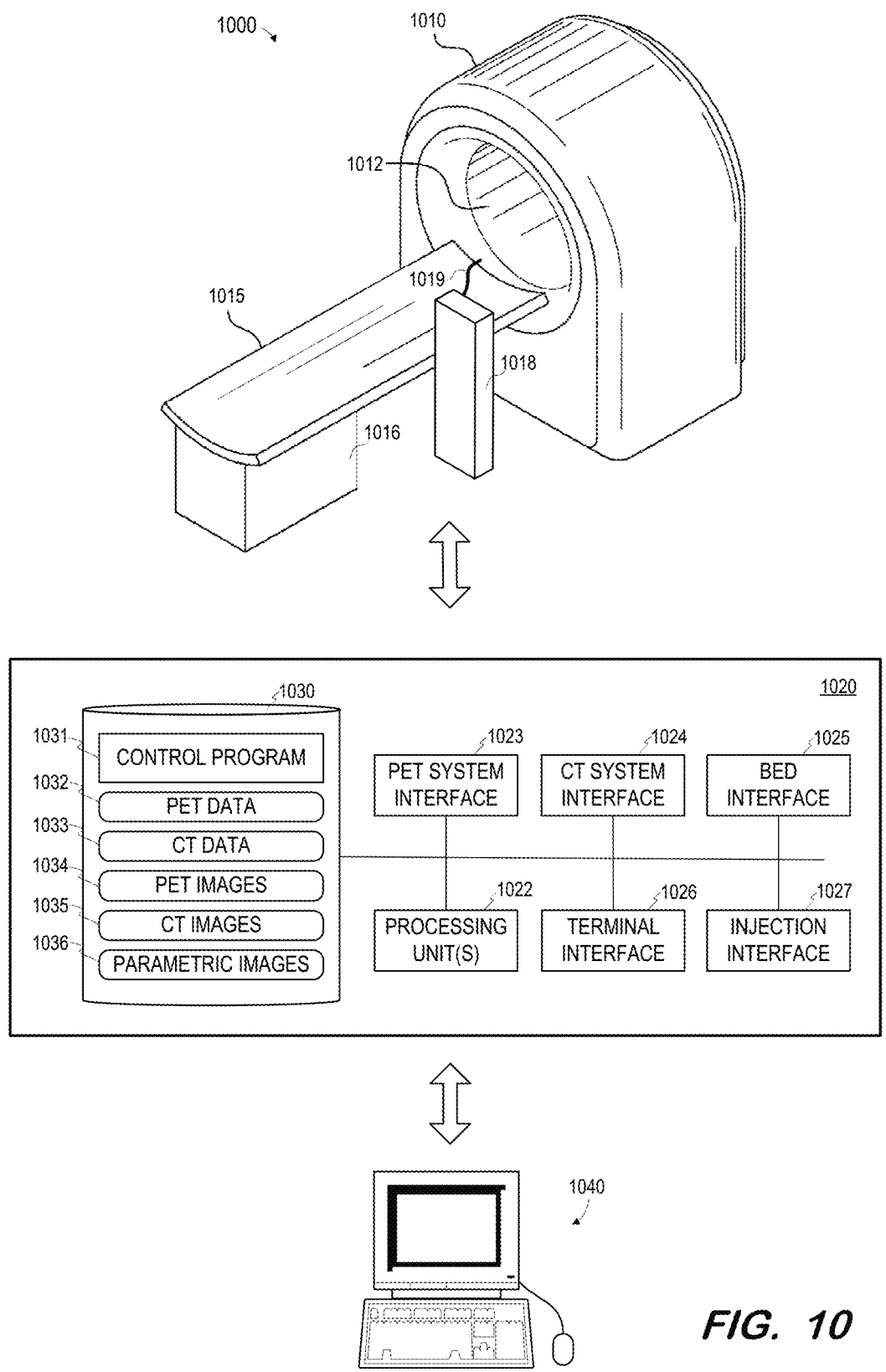
FIG. 10 is a block diagram of a PET-CT imaging system according to some embodiments.

FIG. 10 illustrates PET/CT imaging system 1000 to execute one or more of the processes described herein. Embodiments are not limited to system 1000 or to a multi-modality imaging system.

System 1000 includes gantry 1010 defining bore 1012. As is known in the art, gantry 1010 houses PET imaging components for acquiring PET image data and CT imaging components for acquiring CT image data. The CT imaging components may include one or more x-ray tubes and one or more corresponding x-ray detectors as is known in the art. The PET imaging components may include any number or type of detectors including background radiation-emitting crystals and disposed in any configuration as is known in the art.

Bed 1015 and base 1016 are operable to move a patient lying on bed 1015 into and out of bore 1012 before, during and after imaging. In some embodiments, bed 1015 is configured to translate over base 1016 and, in other embodiments, base 1016 is movable along with or alternatively from bed 1015.

Movement of a patient into and out of bore 1012 may allow scanning of the patient using the CT imaging elements and the PET imaging elements of gantry 1010. Bed 1015 and base 1016 may provide continuous bed motion and/or step-and-shoot motion during such scanning according to some embodiments.

Injector 1018 controls injection of imaging contrast and/or radionuclide tracer into a patient per the applicable imaging protocol. Conduit 1019 may carry such contrast and/or tracer to an intravenous connection to the patient.

Control system 1020 may comprise any general-purpose or dedicated computing system. Accordingly, control system 1020 includes one or more processing units 1022 configured to execute processor-executable program code to cause system 1020 to acquire data and generate images therefrom, and storage device 1030 for storing the program code. Storage device 1030 may comprise one or more fixed disks, solid-state random-access memory, and/or removable media (e.g., a thumb drive) mounted in a corresponding interface (e.g., a Universal Serial Bus port).

Storage device 1030 stores program code of control program 1031. One or more processing units 1022 may execute control program 1031 to, in conjunction with PET system interface 1023 and bed interface 1025, control hardware elements to inject a radionuclide tracer into a patient, move the patient into bore 1012 past PET detectors of gantry 1010, and detect photons emitted from the patient based on pulses generated by the PET detectors. The detected photons may be recorded in storage 1030 as PET data 1032, which may comprise raw (i.e., list-mode) data and/or sinograms. Control program 1031 may also be executed to reconstruct PET images 1034 based on PET data 1032 using any suitable reconstruction algorithm that is or becomes known.

One or more processing units 1022 may execute control program 1031 to control CT imaging elements of system 1000 using CT system interface 1024 and bed interface 1025 to acquire CT data 1033. Any suitable reconstruction algorithm may be utilized to generate CT images 1035 based on CT data 1033. According to some embodiments, PET images 1034 may be generated based at least in part on CT data 1033 (e.g., using a linear attenuation coefficient map determined from CT data 1033).

Control program 1031 may be further executed to generate parametric images 1036 based on dynamic PET data 1032 as described herein.

PET images 1032, CT images 1035 and parametric images 1036 may be transmitted to terminal 1040 via terminal interface 1026. Terminal 1040 may comprise a display device and an input device coupled to system 1020. Terminal 1040 may display the received PET images 1032, CT images 1035 and parametric images 1036. Terminal 1040 may receive user input for controlling display of the data, operation of system 1000, and/or the processing described herein. In some embodiments, terminal 1040 is a separate computing device such as, but not limited to, a desktop computer, a laptop computer, a tablet computer, and a smartphone.

Each component of system 1000 may include other elements which are necessary for the operation thereof, as well as additional elements for providing functions other than those described herein. Each functional component described herein may be implemented in computer hardware, in program code and/or in one or more computing systems executing such program code as is known in the art. Such a computing system may include one or more processing units which execute processor-executable program code stored in a memory system.

Those in the art will appreciate that various adaptations and modifications of the above-described embodiments can be configured without departing from the claims. Therefore, it is to be understood that the claims may be practiced other than as specifically described herein.

What is claimed is:

1. A positron emission tomography (PET) scanner system comprising:
    an injector to inject a tracer into a volume comprising blood and tissue;
    at least one processing unit to:
        acquire a computed tomography image of the volume;
        determine voxels of interest based on the computed tomography image;
        acquire PET data of the volume after non-metabolized tracer has reached a steady state between the blood and the tissue;
        reconstruct a plurality of standardized uptake value (SUV) images based on the acquired PET data, each of the plurality of SUV images associated with a respective PET data acquisition time period
        determine a post steady-state blood input function (BIF) based on the voxels of interest of each of the SUV images;
        determine parametric images based on the acquired PET data and a parametric model comprising basis functions and the post steady-state BIF of the volume, where each parametric image is associated with a respective one of the basis functions, and where determination of the parametric images comprises:
            extraction of a time-activity curve for each image voxel of the SUV images based on the SUV images; and
            fitting of the time-activity curves to the parametric model; and
    a display to display the parametric images.

2. A positron emission tomography (PET) scanner system comprising:
    an injector to inject a tracer into a volume comprising blood and tissue;
    at least one processing unit to:
        acquire a computed tomography image of the volume;
        determine voxels of interest based on the computed tomography image;
        acquire PET data of the volume after non-metabolized tracer has reached a steady state between the blood and the tissue;
        reconstruct a plurality of standardized uptake value (SUV) images based on the acquired PET data, each of the plurality of SUV images associated with a respective PET data acquisition time period;
        determine a post steady-state blood input function (BIF) based on the voxels of interest of each of the SUV images; and
        determine parametric images based on the acquired PET data, the post steady-state BIF and a parametric model comprising basis functions which do not include BIF values prior to the steady state, where each parametric image is associated with a respective one of the basis functions, by fitting the parametric model including the post steady-state BIF during the reconstruction of a SUV image based on the acquired PET data.

3. The system of claim 1, wherein the parametric model is:

$$C_t(t) - C_t(t^*) = K_i \int_t^\tau C_b(t')dt' + DV(C_b(t) - C_b(t^*)), t > t^*$$

where $t^*$ is a time at which the non-metabolized tracer has reached a steady state between the blood and the tissue, $C_t$ is the tracer activity concentration in tissue, $C_b$ is the tracer concentration in arterial blood supplying the tissue, $K_i$ is the rate of irreversible uptake, and DV is the apparent distribution volume of the non-metabolized tracer.

4. The system of claim 1, wherein the parametric model is:

$$C_t(t) = \alpha C_b(t) - \alpha e^{\frac{t-t^*}{\beta}} C_b(t^*) - \alpha \int_{t^*}^{t} e^{\frac{t-t'}{\beta}} \left(\frac{d}{dt'} C_b(t')\right) dt' + C_t(t^*) e^{\frac{t-t^*}{\beta}}, t > t^*$$

where t* is a time at which the non-metabolized tracer has reached a steady state between the blood and the tissue, $C_t$ is the tracer activity concentration in tissue, and $C_b$ is the tracer concentration in arterial blood supplying the tissue.

5. A method comprising:
acquiring a computed tomography image of a volume;
determining voxels of interest based on the computed tomography image;
acquiring positron emission tomography (PET) data of the volume after non-metabolized tracer has reached a steady state between the blood and the tissue;
reconstructing a plurality of standardized uptake value (SUV) images based on the acquired PET data, each of the plurality of SUV images associated with a respective PET data acquisition time period;
determining a post steady-state blood input function (BIF) based on the voxels of interest of each of the SUV images; and
determining parametric images based on the acquired PET data and a parametric model and the post steady-state BIF of the volume by:
extracting a time-activity curve for each image voxel of the SUV images based on the SUV images; and
fitting the time-activity curves to the parametric model.

6. A method comprising:
acquiring a computed tomography image of the volume;
determining voxels of interest based on the computed tomography image;
acquiring PET data of the volume after non-metabolized tracer has reached a steady state between the blood and the tissue;
reconstructing a plurality of standardized uptake value (SUV) images based on the acquired PET data, each of the plurality of SUV images associated with a respective PET data acquisition time period;
determining a post steady-state blood input function (BIF) based on the voxels of interest of each of the SUV images; and
determining parametric images based on the acquired PET data, the post steady-state BIF and a parametric model comprising basis functions which do not include BIF values prior to the steady state, where each parametric image is associated with a respective one of the basis functions, by fitting the parametric model and the acquired PET data within the reconstruction of a standardized uptake value (SUV) image.

7. The method of claim 5, wherein the parametric model is:

$$C_t(t) - C_t(t^*) = K_i \int_t^{t} C_b(t') dt' + DV(C_b(t) - C_b(t^*)), t > t^*$$

where t* is a time at which the non-metabolized tracer has reached a steady state between the blood and the tissue, $C_t$ is the tracer activity concentration in tissue, $C_b$ is the tracer concentration in arterial blood supplying the tissue, $K_i$ is the rate of irreversible uptake, and DV is the apparent distribution volume of the non-metabolized tracer.

8. The method of claim 5, wherein the parametric model is:

$$C_t(t) = \alpha C_b(t) - \alpha e^{\frac{t-t^*}{\beta}} C_b(t^*) - \alpha \int_{t^*}^{t} e^{\frac{t-t'}{\beta}} \left(\frac{d}{dt'} C_b(t')\right) dt' + C_t(t^*) e^{\frac{t-t^*}{\beta}}, t > t^*$$

where t* is a time at which the non-metabolized tracer has reached a steady state between the blood and the tissue, $C_t$ is the tracer activity concentration in tissue, and $C_b$ is the tracer concentration in arterial blood supplying the tissue.

9. A non-transitory medium storing program code, the program code executable by at least one processing unit to cause a computing system to:
acquire a computed tomography image of a volume comprising blood and tissue;
determine voxels of interest based on the computed tomography image;
acquire positron emission tomography (PET) data of the volume;
reconstruct a plurality of standardized uptake value (SUV) images based on the acquired PET data, each of the plurality of SUV images associated with a respective PET data acquisition time period;
determine a post steady-state blood input function (BIF) based on the vowels of interest of each of the SUV images; and
determine parametric images based on the acquired PET data, the post steady-state BIF and a parametric model comprising basis functions which do not include BIF values prior to the steady state, where each parametric image is associated with a respective one of the basis functions, by fitting the parametric model including the post steady-state BIF during the reconstruction of a SUV image based on the acquired PET data.

10. The medium of claim 9, wherein the parametric model is:

$$C_t(t) - C_t(t^*) = K_i \int_t^{t} C_b(t') dt' + DV(C_b(t) - C_b(t^*)), t > t^*$$

where t* is a time at which the non-metabolized tracer has reached a steady state between the blood and the tissue, $C_t$ is the tracer activity concentration in tissue, $C_b$ is the tracer concentration in arterial blood supplying the tissue, $K_i$ is the rate of irreversible uptake, and DV is the apparent distribution volume of the non-metabolized tracer.

11. The medium of claim 9, wherein the parametric model is:

$$C_t(t) = \alpha C_b(t) - \alpha e^{\frac{t-t^*}{\beta}} C_b(t^*) - \alpha \int_{t^*}^{t} e^{\frac{t-t'}{\beta}} \left(\frac{d}{dt'} C_b(t')\right) dt' + C_t(t^*) e^{\frac{t-t^*}{\beta}}, t > t^*$$

where t* is a time at which the non-metabolized tracer has reached a steady state between the blood and the tissue, $C_t$ is the tracer activity concentration in tissue, and $C_b$ is the tracer concentration in arterial blood supplying the tissue.

* * * * *